United States Patent [19]

Ito

[11] Patent Number: 6,018,740
[45] Date of Patent: Jan. 25, 2000

[54] METHOD TO MAKE A LATIN SQUARE

[75] Inventor: Toru Ito, Yokohama, Japan

[73] Assignee: Nico Electronics Co., Ltd., Yokohama, Japan

[21] Appl. No.: 08/939,840

[22] Filed: Sep. 29, 1997

[30] Foreign Application Priority Data

Sep. 30, 1996 [JP] Japan .................................. 8-260006

[51] Int. Cl.[7] .................................................. G06F 17/30
[52] U.S. Cl. ........................................................ 707/102
[58] Field of Search ................................ 707/102; 380/28

[56] References Cited

U.S. PATENT DOCUMENTS 4,364,182 12/1982 Jones ........................................... 33/174
5,142,686 8/1992 Hecht et al. ............................. 395/800
5,838,796 11/1998 Mittenthal .................................. 380/28

*Primary Examiner*—Wayne Amsbury
*Assistant Examiner*—Cheryl Lewis
*Attorney, Agent, or Firm*—Oliff & Berridge, PLC

[57] ABSTRACT

This invention enables exactly, regularly and simply to make every Latin square which has the optional degree and mark, so that it improves a useful and effective value of a Latin square. In this invention, a degree (n) and a mark (m) for making a Latin square (R) are set up, and the mark (m) as an arranging factor (Eij) on each position (Kij) or the Latin sqare (R) is orderly selected and decided. Then, the Latin square (R) is regularly made by selecting the mark in selecting order along by a line (I) and a column (J) for avoiding the same mark on the same line (I) and column (J) at each position (Kij).

20 Claims, 15 Drawing Sheets

R (J)

| | 1 | 2 | 3 | ......... | n |
|---|---|---|---|---|---|
| 1 | $K_{11}$ $E_{11}$ | $K_{12}$ $E_{12}$ | $K_{13}$ $E_{13}$ | ......... | $K_{1n}$ $E_{1n}$ |
| 2 | $K_{21}$ $E_{21}$ | $K_{22}$ $E_{22}$ | $K_{23}$ $E_{23}$ | ......... | $K_{2n}$ $E_{2n}$ |
| 3 | $K_{31}$ $E_{31}$ | $K_{32}$ $E_{32}$ | $K_{33}$ $E_{33}$ | ......... | $K_{3n}$ $E_{3n}$ |
| ⋮ | ⋮ | ⋮ | ⋮ | ⋮ | ⋮ |
| n | $K_{n1}$ $E_{n1}$ | $K_{n2}$ $E_{n2}$ | $K_{n3}$ $E_{n3}$ | ......... | $K_{nn}$ $E_{nn}$ |

METHOD TO MAKE A LATIN SQUARE

1. FIELD OF INVENTION

This invention relates to a method to make a Latin square which is used for setting up a combination having non-identification, such as a specific calculating chart for a cypher correspondence, an experimental plan, statistics and others.

2. DESCRIPTION OF RELATED ART

According to literature, "Encyclopedia of Mathematics: $3^{rd}$ version, published by Iwanami-shoten Co., Ltd., Japan", a Latin square basically has the following character.

When each element of a set "A" ($=a_1,\ldots,A_n$) consisting of n pieces of a mark is used at n times, the element of $n^2$ pieces in total is arranged as a square having n line(s) and n column(s). In the event that each element of "A" appears once, it is named, "a Latin square on A" or "a Latin square of n degree" (a n degree Latin square).

A square which has a natural permutation on the first line and the first column is called, "an existing Latin square" or "a standard Latin square". In a case that a number of pieces of Latin squares equals to L(n), a total number of n degree Latin square becomes n!(n−1)!L(n). Furthermore, L(n) becomes the following values when L(n) is less than 9:

L(1)=1

L(2)=1

L(3)=1

L(4)=4

L(5)=56

L(6)=9408

L(7)=16942080

L(8)=535281401856

L(9)=377597570964258816

A basic form of a 4 degrees Latin square to be A=(0, 1, 2, 3) becomes an example shown on FIG. 15-(a), which belongs to a standard Latin square shown on FIG. 15-(b) because every arranging factor on the first line and the first column is a natural permutation having 0~3. "·" to be the values or the arranging factor on FIG. 15-(b) is set up as the optional value (0 to 3) forming a Latin square.

Since there were no methods to regularly make a Latin square in the past, a Latin square has been made by trial and error. For example, when making a 4 degrees Latin square (n=4), in a case of "A"=(0, 1, 2, 3), the marks, 0, 1, 2, 3 become arranging factors for the first line, and mark(s) slided per one line become(s) arranging factor for the second and also subsequent lines in order to make a Latin square shown on FIG. 16. However, such a method is not only difficult but also complicated for making a Latin square. Therefore there was a difficult problem which could not improve a useful and effective value of a Latin square in the past.

This invention was created to simply solve the above-mentioned problem in prior art, wherein it is a technical purpose that a Latin square having the optional degree is simply and regularly made in accordance with a certain method so that a Latin square is broardly used with a more useful and effective value.

SUMMARY OF THE INVENTION

A means of a method in claim 1 of this invention to improve the above-mentioned problem is achieved by the following process.

A degree (n) or a Latin square (R) to be made is set up, and a mark (m) for the degree (n) is set up in accordance with a permutation and a selecting order based upon the permutation. When a mark (m) as one or arranging factors (Eij) at each position on a line (I) and a column (J) of the Latin square (R) is selected and decided, a selecting decision is orderly carried out along by the line (I) and/or the column (J) from the first position (Kij) on the line (I) and the column (J) until the last position (Knn) on the line (I) and the column (J). In this case, the decision is carried out on the basis of selecting order through selecting the mark (m) in order to avoid the same mark (m) to be an arranging factor (Eij) already decided at a front position (Kij) on the same line (I) and column (J).

The invention in claim 2 is achieved by adding the invention in claim 1 into it through the under-mentioned process.

A mark (m) as an arranging factor (Eij) already decided at a front position (Kij) is advantageously selected and decided instead of a different mark (m) to be subsequent to the mark (m) when the mark (m) is orderly selected in order to avoid the same mark (m) to be an arranging factor (Eij) alraedy decided at the front position (Kij) on the same line (I) and column (J) at each position (Kij), if there is not a mark (m) to be selected and decided at the optional position (Kij).

The invention in claim 3 is achieved by setting up a selecting order of a mark "m" in accordance with an order of the permutation or the mark (m).

The invention in claim 4 is achieved as follows with carrying out the previous inventions in claims 1, 2 and/or 3, wherein a mark (m) to be an arranging factor (Eij) at a position (Kij) on the first line (I) and the first column (J) is set up in advance as a standard Latin square, and a selection for deciding a mark (m) as one of arranging factors (Eij) to be put at other position (Kij) is orderly carried out from a position (K22).

The invention in claim 5 shows other composition of this invention, which is carried out by the following process According to setting up an existing Latin square (R'), a degree (n) of a Latin square (R) to be newly made, a permutation of a mark (m) for the degree (n) and selecting order in accordance with the permutation are set up. After a mark (m) was put back at a position (Kij) being capable or selecting a mark (m) to be subsequent to a mark (m) of an existing arranging factor (Eij) from the last position (Knn) on the line (I) and the column (J) of the existing Latin square (R') along by the line (I) and the column (J), the mark (m) put back at the position (Kij) is selected and decided for avoiding the same mark (m) as an arranging factor (EiJ) at the front position (Kij) on the same line (I) and column (J) which was already decided at each position (KiJ) being from the position (Kij) until the last position (Knn) along by the line (I) and the column (J).

The invention In claim 6 is achieved by the following process.

After a mark (m) as an arranging factor (Eij) was returned to a position (Kij) being capable of selection of a mark (m) to be subsequent to a mark (m) as an existing arranging factor (Eij) from the last position (Knn) on a line (I) and a column (J) of an existing Latin square (R') along by the line (I) and the column (J), a selection to decide a mark (m) as an arranging factor (Eij) which is in a range from the returned position (Knn) until the last position (Knn) is carried out for the positions (Kij) on the line (I) and the column (J) except for the first line (I) and the first column (J) of the existing Latin square (R').

The invention in claim 7 means that an existing Latin square (R') becomes a standard Latin square described in claim 6.

As described in claim 1, when a degree (n) or a Latin square (R) to be newly made, a permutation of a mark (m) for the degree and a selecting order are set up, a selecting order in accordance with the permutation for the degree (n) is set up. This selecting order in accordance with the permutation of the mark (m) means to set up that, for example, in a case of a degree (n)=4 degrees=0, 1, 2, 3 as a mark (m), [0→1→2→3] is set up as a permutation (natural permutation) and also is decided to be orderly selected, [0→1→2→3].

A mark (m) to be set up is not restricted. Therefore, it Is possible to set up other optional marks, for example (1, 2, 3, 4), (a, b, c, d), etc. Examples having these marks e shown on FIG. 2-(a), -(b) and -(c).

A selecting decision of a mark (m) as an arranging factor (Eij) for each position (KiJ) of a latin square (R) is carried out from the first position (Kij) along by a line (I) shown on FIG. 3(a) or along by a column (J) shown on FIG. 3.-(b). When selecting a mark (m), a value of a mark (m) which is different from an arranging factor (Eij) already decided at a position (Kij) being the front of the mark (m) is selected and decided. Thus, a Latin square (R) is made by such a repeating process.

The invention in claim 2 shows regarding how to continue a selecting procedure of a mark (m) in a case of no selectable mark (m) on the halfway at the position (Kij). In this case, after returning to a front of the position (Kij), a mark (m) alraedy decided as an arranging factor (Eij) at the position (Kij) is selected instead of A subsequent mark (m). As a result, there is a feasibility at the next position (Kij) in which there was not a selectable mark (m) in order to select and decide the selected mark (m) at the front position (Kij).

The invention in claim 3 shows that a selecting order or a mark (m) is defined in an order of the natural permutation and a Latin square (R) to be newly made here becomes a standard Latin square.

The invention in claim 4 shows a method as to how to simply make a standard Latin square shown on FIG. 4-(a) and -(b). Wherein, a position (Kij) in which a mark (m) as an arranging factor is selected and designated is carried out in an order along by a line (I) and a column (J).

The invention in claim 5 shows a method to make every Latin square (R) having the same degree and mark as the existing Latin squares (R') from an existing Latin square (R'). Wherein, a new Latin square (R) is made from a Latin square (R) which has been just made. Thus, a process to make every Latin square (R) is achieved by repeating the same process to make a Latin square (R).

The invention in claim 6 shows a method to make a group of the Latin squares (R) having the same line and column from an existing Latin square (R'). The invention in claim 7 shows a method to make a group of the standard Latin squares.

DETAILED DESCRIPTION OF PREFERRED EMBODIMENTS

The under-mentioned is an explanation for FIGS. 5 and 15, wherein it is fixed for simpler explanation that, degree= 4, mark (m)=natural numeral (0, 1, 2, 3) and permutation & selecting order are according to natural permutation.

FIG. 5 shows a block composition of an electric circuit prepared for a practical method in this invention, which comprises an operating portion 1 for not only carrying out softwarely operarting process, but also setting up a degree (n), a mark (m), a permutation of the mark (m), selecting orders for them, a position (Kij) to select the first arranging factor (Eij), an order to select arranging factor (Eij) and an existing Latin square (R'). In this operating portion, various kinds of operation according to a controlling program set in advance is carried out. Furthermore, wherein the various operations for making a Latin square (R), such as selection, comparison, set of a position on a line and a column are carried out.

2 on FIG. 5 shows a memorizing portion for setting up a line position to designate a line position of a mark (m) to be selected and decided, 3 shows a memorizing portion for setting up a column position to designate a column position of a mark (m) to be selected and decided, 4 shows a memorizing portion for comparing a line position to designate a line position of a mark (m) to be selected and a mark (m) to be compared, 5 shows a memorizing portion for comparing a column position to designate a column position of a mark (m) to be selected and a mark (m) to be compared, 6 shows a memorizing portion for setting up a mark for Input and output of a mark (m) to be selected, 7 shows a memorizing portion for comparing marks for inputting and outputting for a mark (m) to be selected and a mark (m) to be compared, 8 shows a memorizing portion for comparing a mark (m) to be selected and a mark (m) to be compared, 9 shows an arrangement for memorizing a Latin square which arranges and memorizes values of each arranging factor (Eij) of a Latin square (R) to be made, wherein each arranging-memorizing factor (9ij) of an arrangement (9) for memorizing the Latin square corresponds to an arranging factor (Eij), and the value which was decided is memorized.

FIG. 6 shows an example of a flowchart of the invention in claims 1 or 4. In Step 1 (S1,) a degree (n), a mark (m), a permutation and a selecting order of the mark (m) are set up at an operating portion (1), and in Step 2 (S2), a position (Kij) for firstly selecting an arranging factor (Eij) and an order for selecting an arranging factor (Eij) are set up at an operating portion (1).

In Step 3, it is judged at a memorizing portion (2) for setting a line position and a memorizing portion (3) for setting column position at an operating portion (1) as to whether or not a designated position (Kij) comes to a top position. In a case of "Yes", it jumps toward "S6". On the contrary in a case of "No", in Step 4 (S4), output of a memorizing portion (6) for setting a mark (m) and output of a a memorizing portion (7) for comparing a mark are compared each other at a mark comparing portion (8) as to whether or not there is the same mark in a front position (Kij) on the same line and column.

In Step 5, in a case of "Yes"—(there is not the same mark)—on the basis of comparison in Step 4 (S4), a value of the mark (m) at this position (Kij) is memorized at each arranging-memorizing factor (9ij) which is corresponding as an arranging factor (Eij). In Step 6, the value is put on the next position (Kij).

In Step 7 (S7), it is judged as to whether or not the position (Kij) is the last position. In a case of "No", after returning to Step 3 (S3) and the same process in Steps 3 (S3) to 7 (S7) is repeated. Thus, a Latin square is completed at the final Step 8 only when the position is "Yes".

In Step 5 (S5), in a case of "No" (in a case that there is the same mark.), a mark (m) is set up in a selecting order in Step 9. The mark (m) newly set up is judged in Step 10 (S10) as to whether or not it is beyond the range or the mark (m).

In Step 10 (S10), in a case of "No" (not beyond the range indicating marks already set, such as 0, 1, 2, 3), the mark (m) is retuned to Step 3 (S3) to repeat the same process in Steps 3 (S3) to 7 (S7). In a case of "Yes" (beyond the range), the mark is forwarded to Step 11 (S11) to change a mark (m) as an arranging factor (Eij) already decided at a front or the position (Kij) after returning to Step 9.

FIG. 7 shows a making process of a Latin square (R) in accordance with a flowchart on FIG. 6, which becomes a basic Latin square because of having a natural permutation.

FIG. 8 shows a flowchart of the invention in claims 5 or 7, in addtion Steps 1 and 2, wherein Step S2' as a new process is carried out for setting up an existing Latin square (R') otherwise Steps 1 and 2.

In this Step S', the process for making a Latin square (R) starts from Step 9 (S9) in order to regard a mark (m) which is an arranging factor (Eij) at the last position (Kij) as a mark (m) for the next selection, and a range of a mark (m) which was set in Step 9 (S9) is judged in Step 10 (S10).

In a case of "Yes" in Step 10 (beyond the range), the mark (m) is put back at a front position (Kij) and is processed from Step 9 again. In a case of "No" (not beyond the range), the mark (m) is orderly put in Steps 3, 4, 5. Further, in a case of "No" in Step 5 (there is the same one), the mark (m) is put back In Step 9, and the same process is repeated therein until it is judged "Yes" in Step 10 (S10).

The mark (m) was put back at the front position (Kij) through Steps 10 and 11 until obtaining "Yes" (there is not the same one.) in Step 5 (S5). (Refer to FIG. 9-b)

When judging "Yes" in Step 5 (S5) through such a repetition, the mark is forwarded in Step 6 for making a new Latin square (R) by the same process on FIG. 6.

FIG. 9 shows a process to newly make a Latin square (R) on the basis of an existing Latin square (R') in accordance with a flowchart shown on FIG. 8.

A method to make a Latin square (R) in accordance with a flowchart shown on FIG. 8 means that it is possible to continue to make a new Latin square (R) from an existing Latin square (R'). FIGS. 10 and 11 are examples regarding how to make new Latin squares (R) from the existing Latin squares (R'), respectively. It is achieved that every Latin square (R) is made by repeating this process.

FIG. 12 shows an example showing that a standard Latin square (R') is newly made from an existing Latin square (R') in accordance with a flowchart shown on FIG. 8. FIG. 13 shows an example as to a standard Latin square (R) is newly made from an existing Latin square (R') which was made on FIG. 12. FIG. 14 shows an example as to a standard Latin square (R) is newly made from an existing standard Latin square (R').

The under-mentioned is an effect coming from the aforementioned composition of this invention.

The invention in claim 1, clarifies exactly, simply and regularly to make a Latin square which has the optional degree and mark.

The invention in claim 2 clarifies as to a method to more exactly and regularly make a Latin square.

The invention in claim 3 clarifies that a simplization for an operational process is completely achieved by a digitalized process in the inventions described in claims 1 and 2.

The invention in claim 4 clarifies as to a method to simply make a standard Latin square.

The invention in claim 5 clarifies that it is possible to regularly make every Latin square having the same degree and mark on the basis of an existing Latin square. Through this process, it is achieved to exactly and simply make a large number of various types of Latin square having the same degree and mark and also to extremely increase useful value and effect of a Latin square.

The invention in claim 6 clarifies that it is possible to exactly and simply obtain every group of Latin square having the same first line and the first column, which matches with various purpose.

The invention in claim 7 clarifies that it is possible to make every standard Latin square having degrees and marks to be set up in order to exactly and simply obtain the most useful standard Latin squares in large numbers.

BRIEF DESCRIPTION OF THE DRAWINGS

FIG. 1 shows a composition of a Latin square which is made by this invention.

Figures 2A, 2B, 2C:
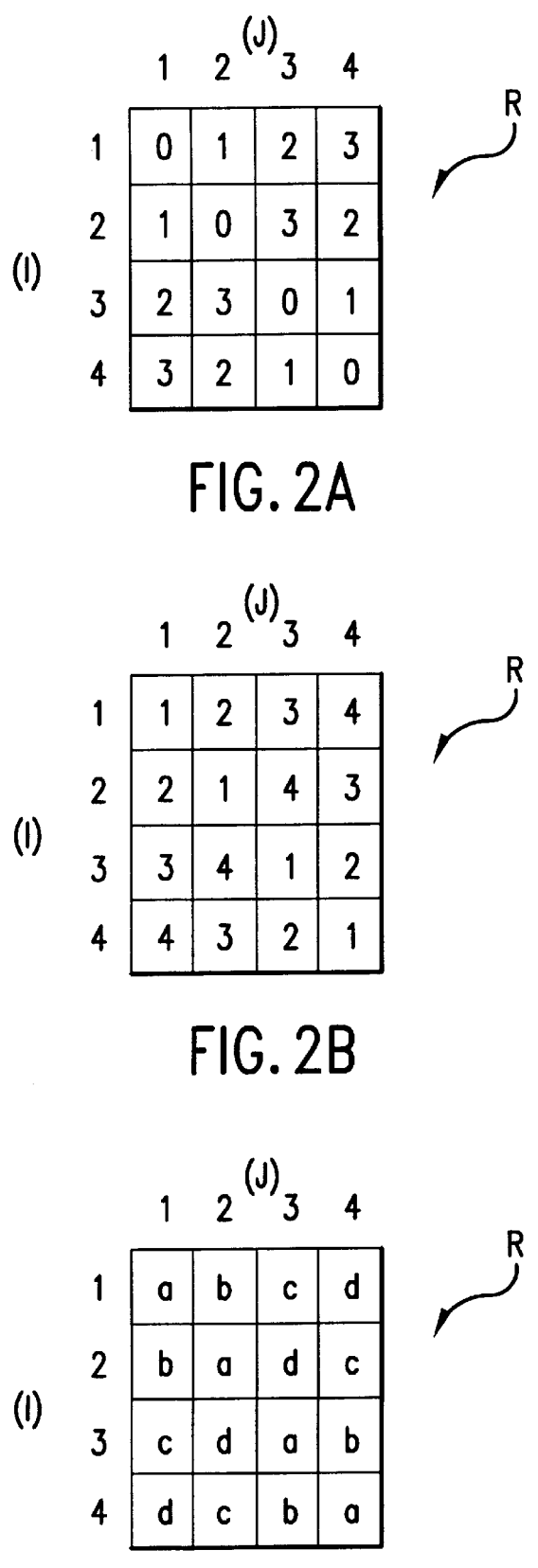

FIG. 2 shows examples of Latin squares having different marks, which are made by this invention.

Figures 4A, 4B:
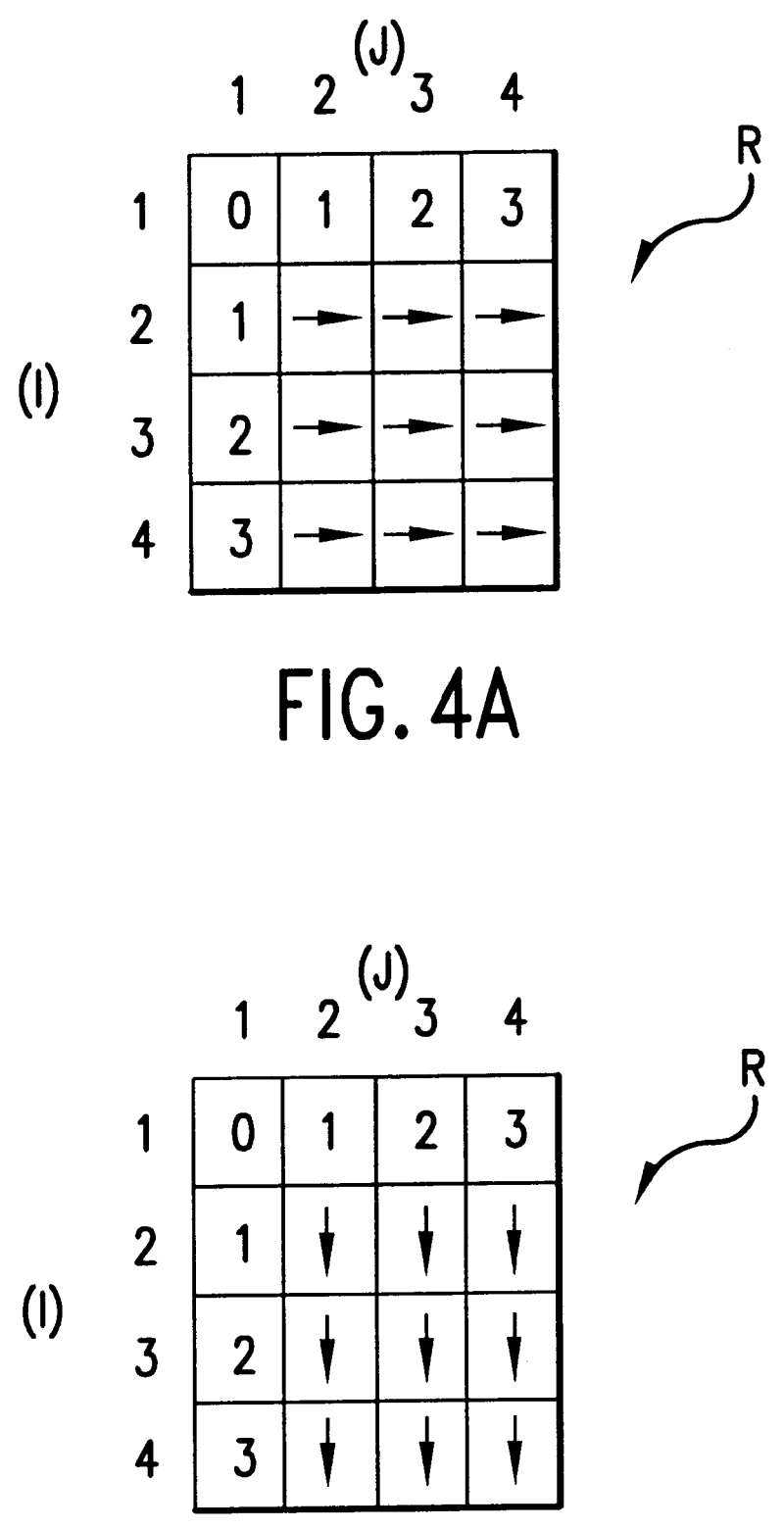

FIG. 4 shows other procedure for making a Latin square according to a first aspect of this invention.

Figures 15A, 15B, 16:
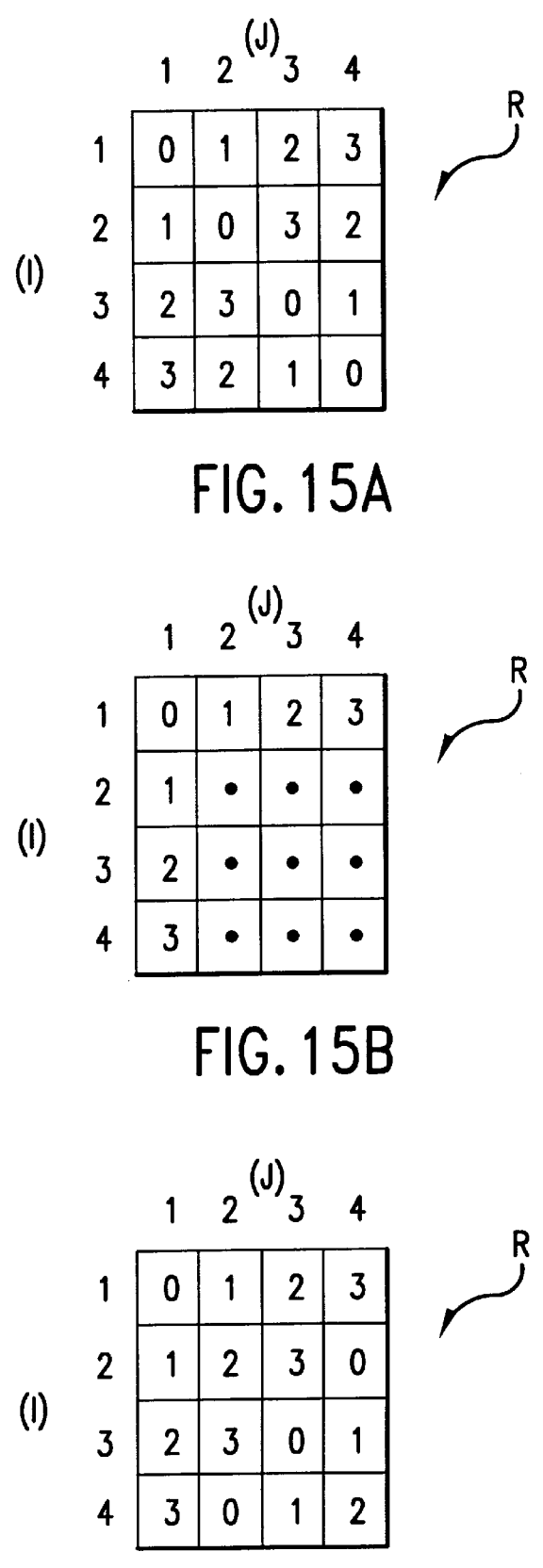

FIG. 15 shows a basic composition of a Latin square.

FIG. 16 shows a Latin square made by using prior art.

Figure 3A:
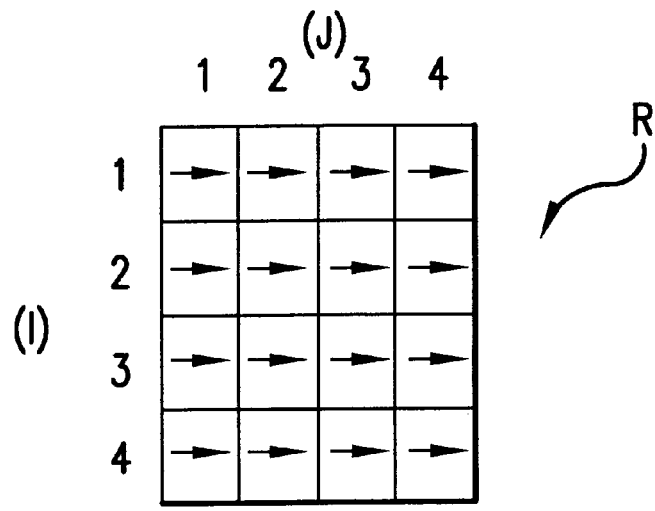
FIG. 3 shows a procedure for making a Latin square according to a first aspect of the invention.

Explanation of Marks:
R—a Latin square
R'—an existing Latin square
I—a line
J—a column
Kij—a position
Eij—an arranging factor
n—a degree
m—a mark
1—an operating portion
2—a memorizing portion for setting up a line position
3—a memorizing portion for setting up a column position
4—a memorizing portion for comparing a line position
5—a memorizing portion for comparing a column position
6—a memorizing portion for setting up a mark 7—a memorizing portion for comparing (a) mark(s)
8—a memorizing portion for comparing marks to be selected and compared
9—an arrangement for memorizing a Latin square

What is claimed is:

1. A method to make a Latin square, the method being implemented in an electric circuit and comprising the steps of:

setting up a degree (n) of a Latin square (R) to be newly made;

setting up a permutation of a mark (m) for the degree (n) and a selecting order in accordance with the permutation;

selecting and deciding a mark (m) as one of arranging factors (Eij) at each position on a line (I) and a column (J) of the Latin square (R), a selecting decision being orderly carried out along by the line (I) or the column (J) from the first position (Kij) on the line (I) and the column (J) until the last position (Knn) on the line (I) and the column (J); and this decision being carried out on the basis of selecting order through selecting the mark (m) in order to avoid the same mark (m) to be an arranging factor (Eij) already decided at a front position (Kij) on the same line (I) and column (J).

2. A method to make a Latin square in claim 1, wherein the mark (m) as an arranging factor (Eij) already decided at the front position (Kij) of the optional position (Kij) is advantageously selected and decided instead of a different mark (m) to be subsequent to the mark (m) when the mark is orderly selected in order to avoid the same mark (m) to be an arranging factor (Eij) already decided at the front position (Kij) on the same line (I) and column (J) at each position (Kij), it there is not a mark (m) to be selected and decided at the optional position (Kij).

3. A method to make a Latin square in claim 1, wherein a selecting order of a mark (m) is set up in accordance with an order of the permutation of the mark (m).

4. A method to make a Latin square in claim 1, wherein a mark (m) to be an arranging factor (Eij) at a position (Kij) on the first line (I) and the first column (J) is set up in advance as a standard Latin square, and a selection for deciding a mark (m) as one of arranging factors (Eij) to be put at other position (Kij) is orderly carried out from a position (K22) on the second line (I) and the second column (J).

5. A method to make a Latin square, the method being implemented in an electric circuit and comprising the steps of:

according to an existing Latin square (R'), setting up a degree (n) of a Latin square (R) to be newly made, a permutation of a mark (m) for the degree (n) and a selecting order in accordance with the permutation;

after a mark (m) was put back at a position (Kij) being capable of selecting a mark (m) to be subsequent to a mark (m) of an existing arranging factor (Eij) from the last position (Knn) on the line (I) and the column (J) of the existing Latin square (R') along by the line (I) and the column (J), the mark (m) put back at the position (Kij) is selected and decided for avoiding the same mark (m) as an arranging factor (Eij) at the front position (Kij) on the same line (I) and column (J) which was already decided at each position (Kij) being from the position (Kij) until the last position (Knn) along by the line (I) and the column (J).

6. A method to make a Latin square in claim 5, wherein after a mark (m) as an arranging factor (Eij) was returned to a position (Kij) being capable of selection of a mark (m) to be subsequent to a mark (m) as an existing arranging factor (Eij) from the last position (Knn) on a line (I) and a column (J) of an existing Latin square (R') along by the line (I) and the column (J), a selection to decide a mark (m) as an arranging factor (Eij) which is in a range from the returned position (Knn) until the last position (Knn) is carried out for the positions (kij) on the line (I) and the column (J) except for the first line (I) and the first column (J) of the existing Latin square (R').

7. A method to make a Latin square claimed in claim 6, wherein an existing Latin square (R') becomes a standard Latin square.

8. A method to determine a Latin square having a degree and a set of pieces of a mark, the method being implemented in an electric circuit and comprising the steps of:

following a position order from a first position in the Latin square to a last position in the Latin square; and for each position according to said position order, selecting a piece of mark different from each piece of mark already selected in a same line and a same column of the Latin square.

9. A method according to claim 8, wherein:

in the case where no piece of mark can be selected for a position, selecting a new piece of mark at the preceding position according to the position order, the new selected piece of mark being different from the previously selected piece of mark at said preceding position, the new selected piece of mark being different from each piece of mark already selected in the same line and the same column as said preceding position.

10. A method according to claim 9, wherein a selection order in the set of pieces of mark is followed for selecting a piece of mark, a first piece of mark in said selection order being first compared to each piece of mark already selected in the same line and the same column of the Latin square, said selection order being the same for all the positions in the Latin square.

11. A method according to claim 8, wherein according to the position order, the pieces of mark corresponding to all the positions in a line are selected before the piece of mark of any position on another line is selected.

12. A method according to claim 8, wherein according to the position order, the pieces of mark corresponding to all the positions in a column are selected before the piece of mark of any position on another column is selected.

13. A method according to claim 8, wherein a selection order in the set of pieces of mark is followed for selecting a piece of mark, a first piece of mark in said selection order being first compared to the each piece of mark already selected in the same line and the same column of the Latin square, said selection order being the same for all the positions in the Latin square.

14. A method according to claim 8, further comprising a step of preselecting pieces of mark positioned in the first line and in the first column of the Latin square before selecting the other pieces of mark.

15. A method according to claim 14, wherein the preselected pieces of mark of the first line and the first column correspond to a standard Latin square.

16. A method to determine a Latin square having a degree and a set of pieces of a mark, on the basis of an existing Latin square, the method being implemented in an electric circuit and comprising the steps of:

following a position order from a first position in the Latin square to a last position in the Latin square;

initializing the Latin square to be determined, as identical to the existing Latin square, except at the last position; and for each position according to said position order, selecting a piece of mark different from each piece of mark already selected in a same line and a same column of the Latin square.

17. A method according to claim 16, wherein:

in the case where no piece of mark can be selected for a position, selecting a new piece of mark at the preceding position according to the position order, the new selected piece of mark being different from the previously selected piece of mark at said preceding position, the new selected piece of mark being different from each piece of mark already selected in the same line and the same column as said preceding position.

18. A method according to claim 17, wherein a selection order in the set of pieces of mark is followed for selecting a piece of mark, a first piece of mark in said selection order being first compared to each piece of mark already selected in the same line and the same column of the Latin square, said selection order being the same for all the positions in the Latin square.

19. A method according to claim 16, wherein a selection order in the set of pieces of mark is followed for selecting a piece of mark, a first piece of mark in said selection order being first compared to each piece of mark already selected in the same line and the same column of the Latin square, said selection order being the same for all the positions in the Latin square.

20. A method according to claim 16, wherein the existing Latin square is a standard Latin square.

* * * * *

UNITED STATES PATENT AND TRADEMARK OFFICE
CERTIFICATE OF CORRECTION

PATENT NO. : 6,018,740
DATED : January 25, 2000
INVENTOR(S) : Toru Ito

It is certified that error appears in the above-identified patent and that said Letters Patent is hereby corrected as shown below:

<u>Title page,</u>
Item [57], ABSTRACT,
Line 6, after "(Kij)" change "or" to -- of --.

<u>Column 1,</u>
Line 43, after "values" change "or" to -- of --;
Line 61, change "broardly" to -- broadly --.

<u>Column 2,</u>
Line 1, change "or" to -- of --;
Line 22, change "alraedy" to -- already --;
Line 28, after "permutation" change "or" to -- of --;
Line 42, change "Atter" to -- After --;
Line 43, after "(Kij) being capable" change "or" to -- of --.

Figure 3B:
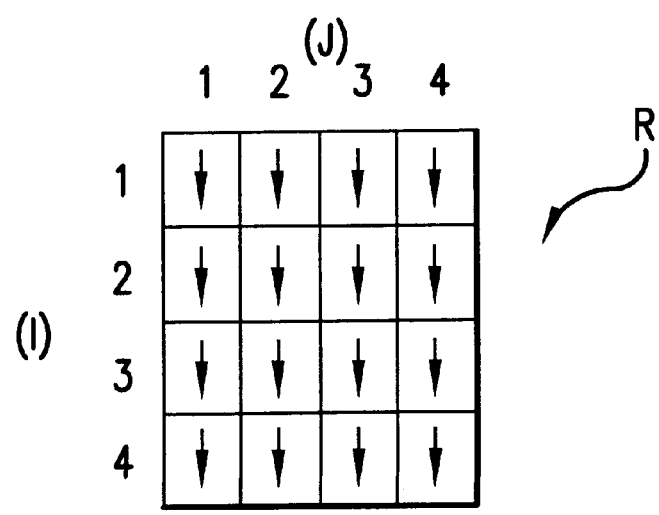
Figure 5:
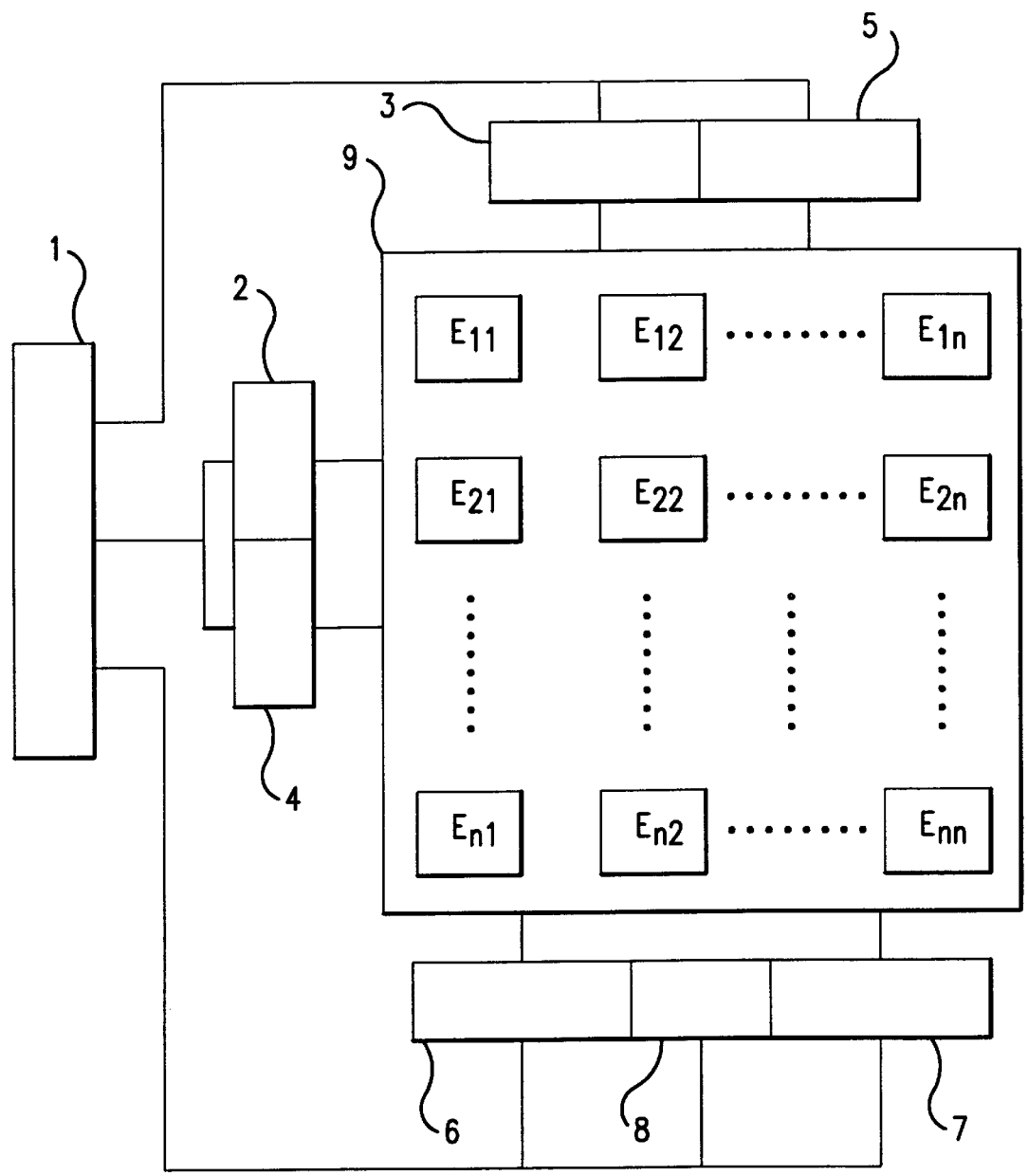
FIG. 5 shows a simplified block chart of composition as an electric circuit for practicing this invention.

<u>Column 3,</u>
Line 4, after "degree (n)" change "or" to -- of --;
Line 16, after "having these marks" change "e" to -- are --;
Line 19, change "(KiJ)" to -- (Kij) --;
Line 21, change "FIG. 3(a)" to -- FIG. 3-(a) --;
Line 31, change "alraedy" to -- already --;
Line 32, after "(Kij) is selected instead of" change "A" to -- a --;
Line 36, after "selecting order" change "or" to -- of --.

<u>Column 4,</u>
Line 2, change "operarting" to -- operating --;
Line 22, change "Input" to -- input --;
Line 48, delete "a" first occurrence;
Line 64, after "the same mark" delete "."

<u>Column 5,</u>
Line 6, after "at a front" change "or" to -- of --;
Line 22, begin a new paragraph starting with "In a case of";
Line 29, after "the same one" delete ".";
Line 58, change "simplization" to -- simplification --.

UNITED STATES PATENT AND TRADEMARK OFFICE
CERTIFICATE OF CORRECTION

PATENT NO. : 6,018,740
DATED : January 25, 2000
INVENTOR(S) : Toru Ito

Figure 6:
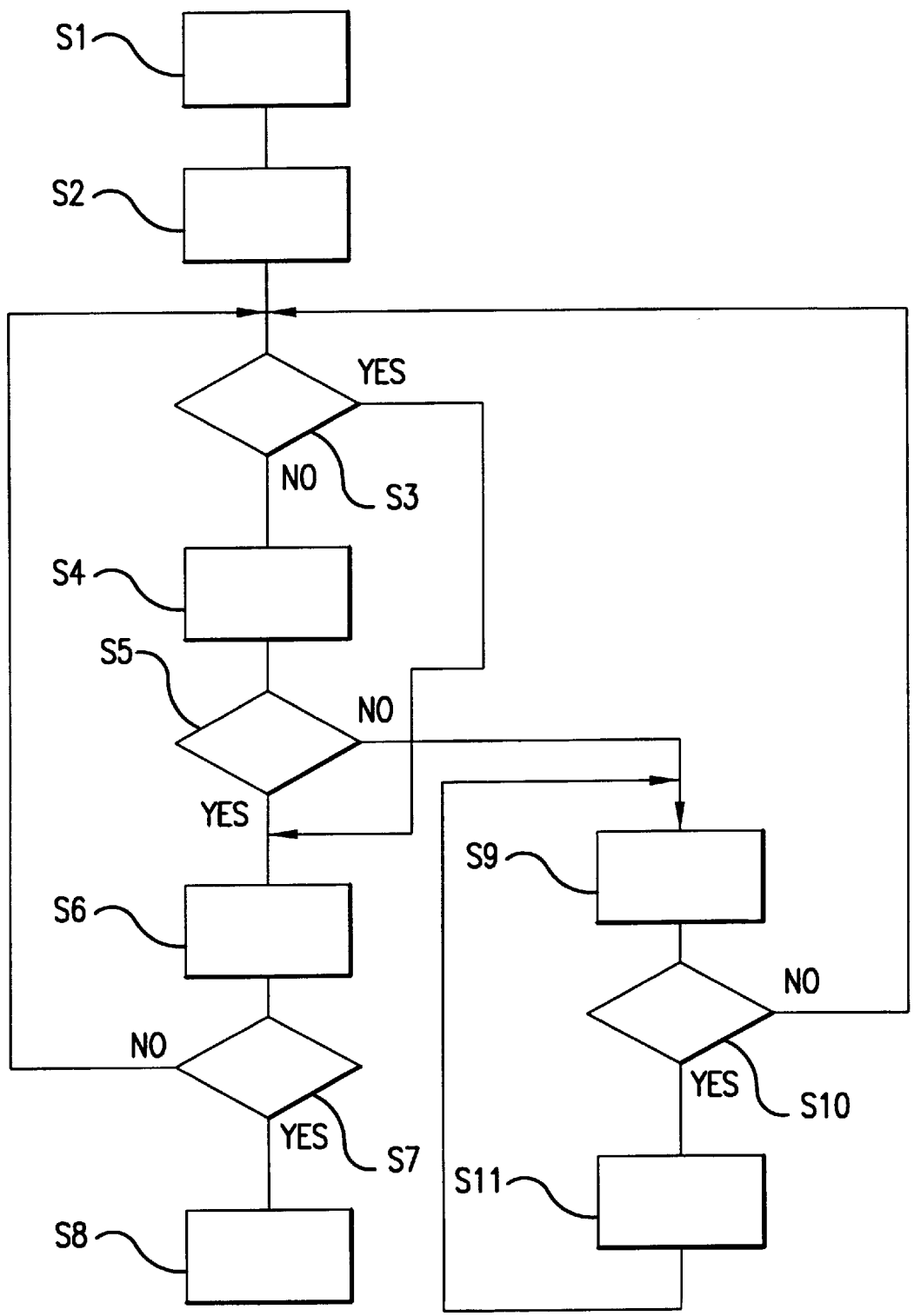
FIG. 6 shows a flowchart explaining movement as an example according to a first aspect of this invention.
Figure 7:
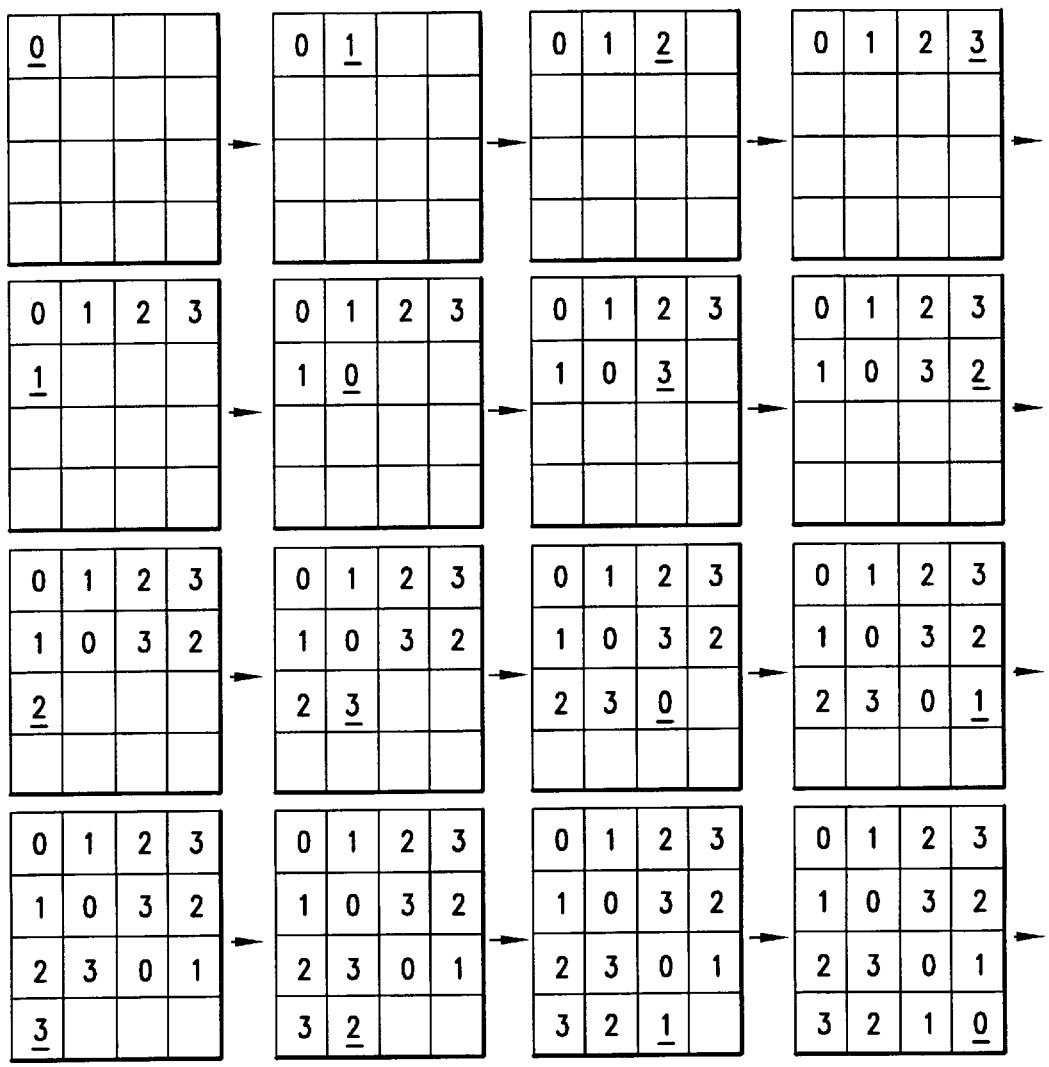
FIG. 7 shows a procedure for making a Latin square on the basis of a flowchart shown on FIG. 6.
Figure 8:
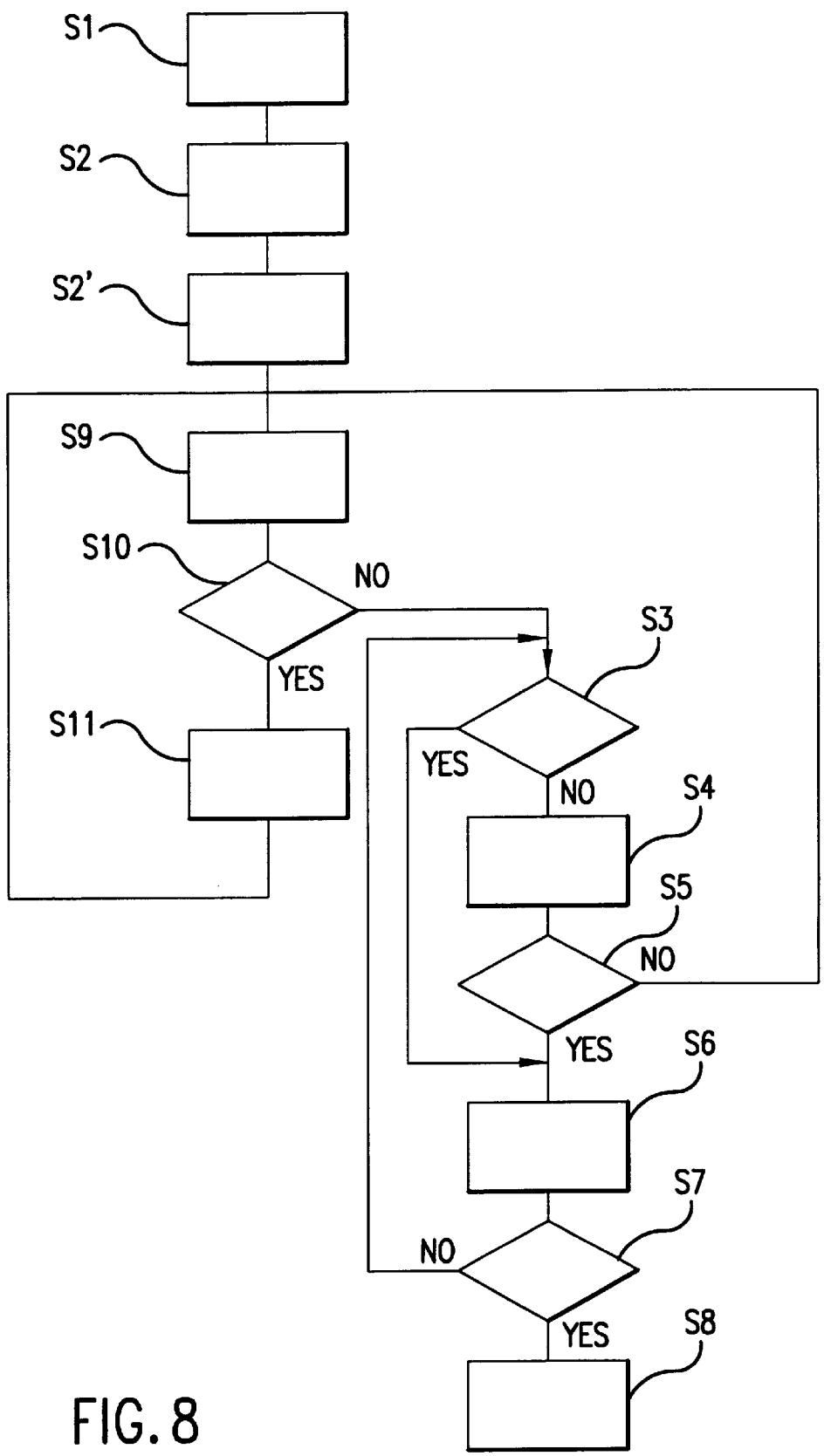
FIG. 8 shows a flowchart explaining movement as an example according to a second aspect of this invention.
Figure 9:
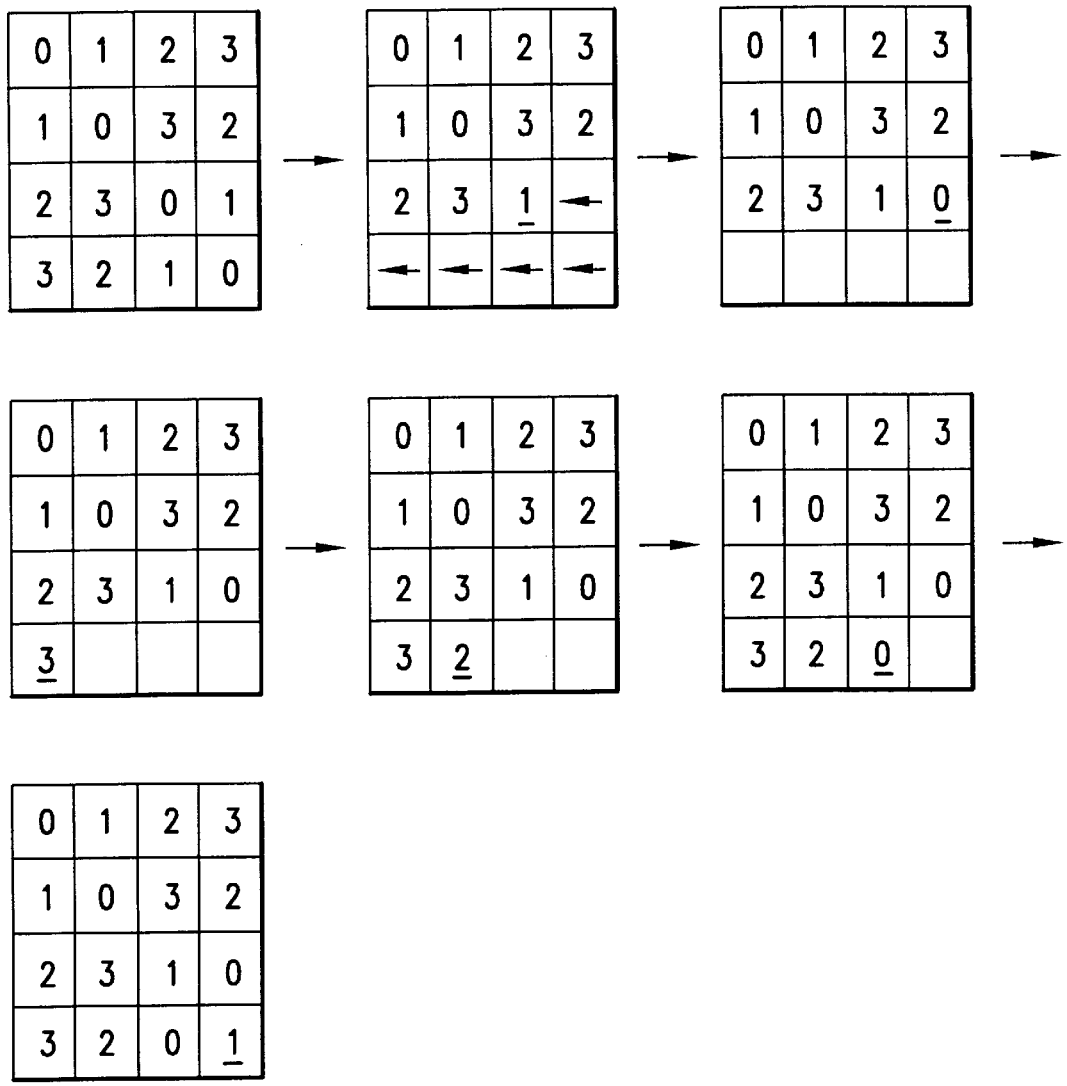
FIG. 9 shows a procedure for making a Latin square on the basis of a flowchart shown on FIG. 8.
Figure 10:
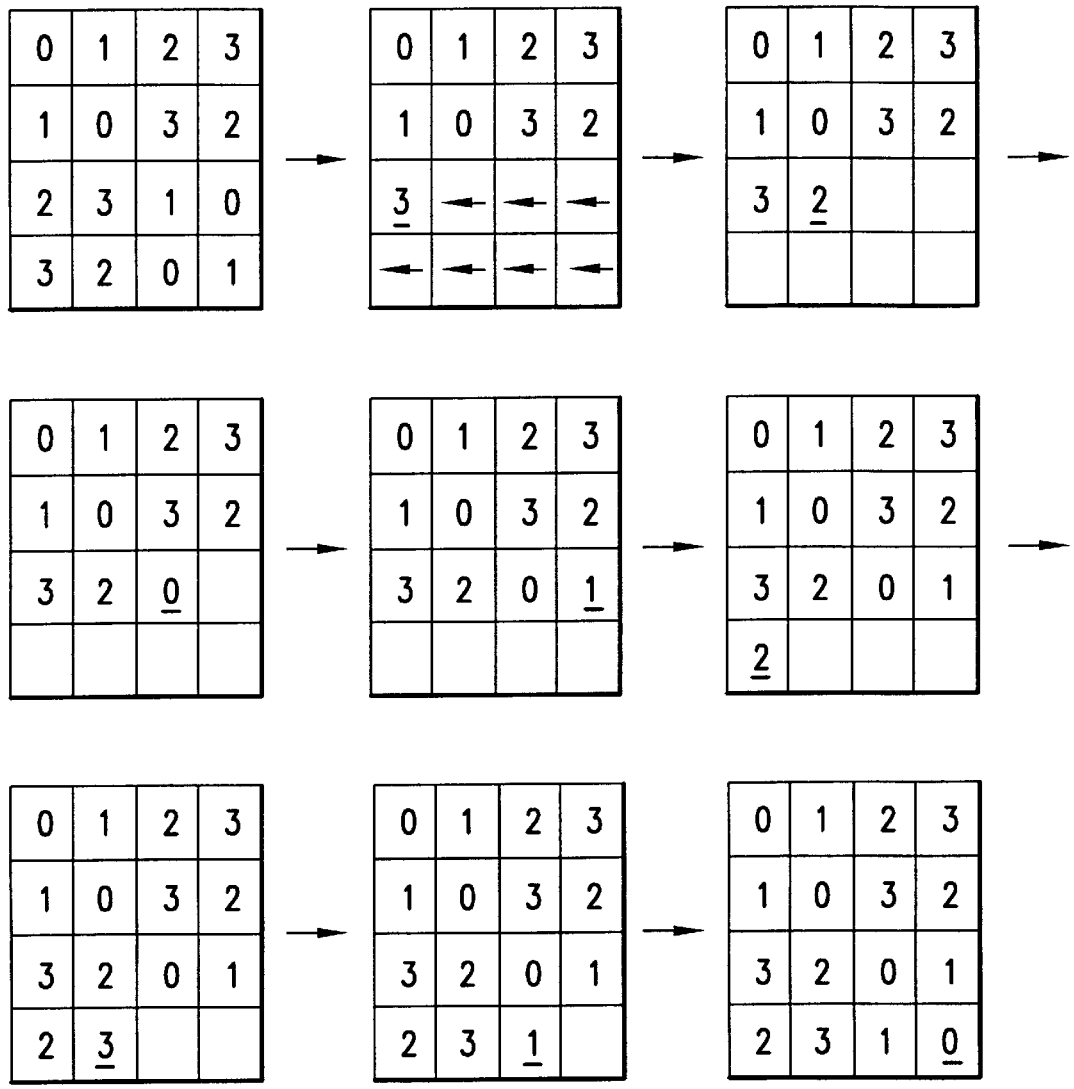
FIG. 10 shows a procedure for making a new Latin square on the basis of a flowchart shown on FIG. 9.
Figure 11:
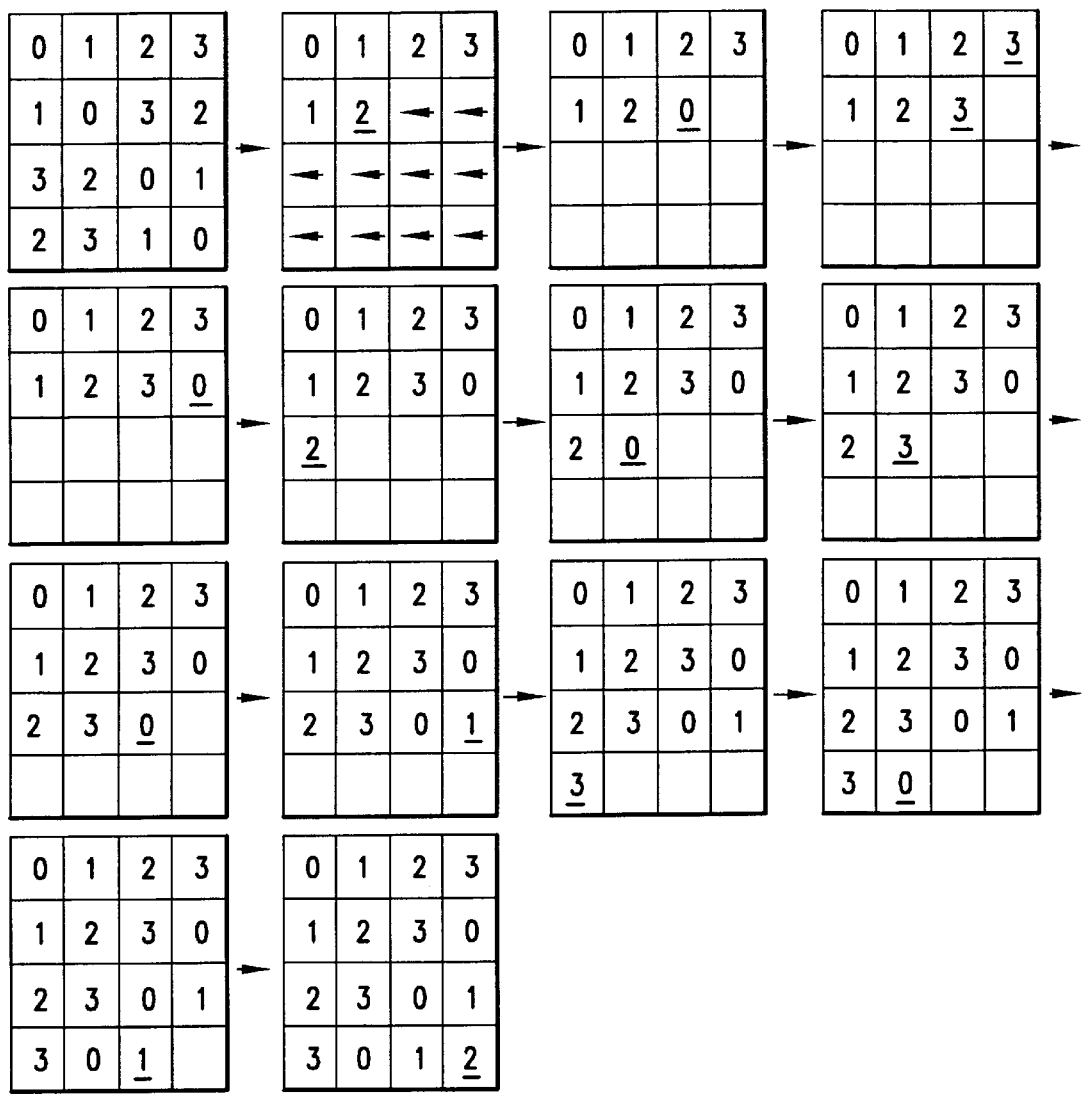
FIG. 11 shows a procedure for making a new Latin square on the basis of a flowchart shown on FIG. 8 by using a Latin square shown on FIG. 10.
Figure 12:
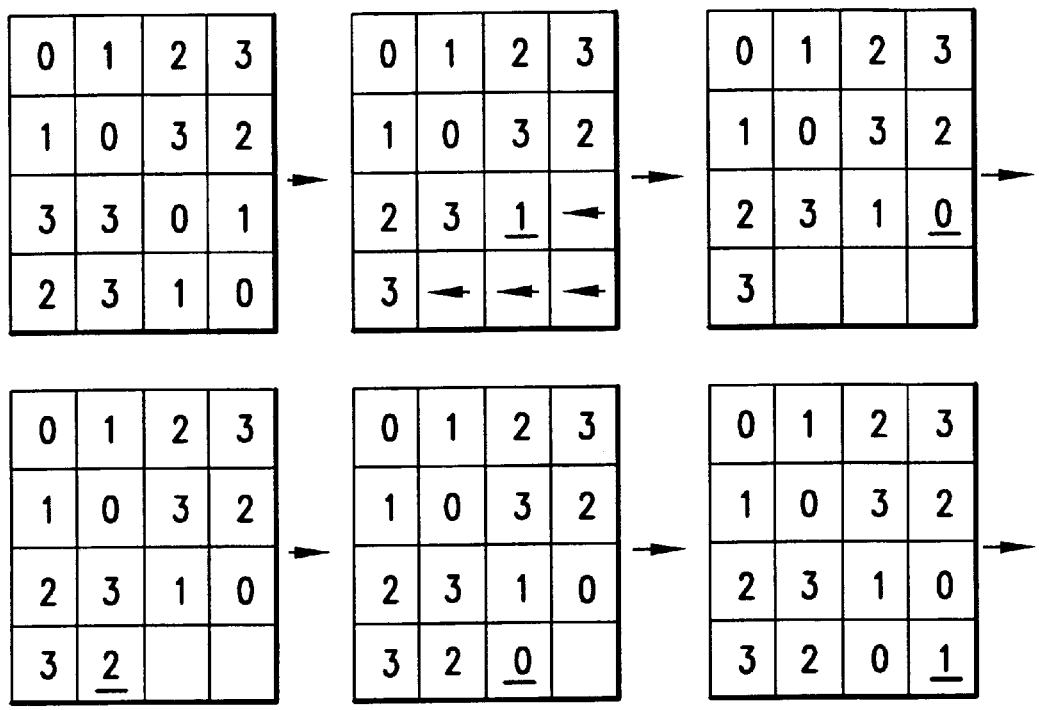
FIG. 12 shows a procedure for making a standard Latin square on the basis of a flowchart shown on FIG. 8.
Figure 13:
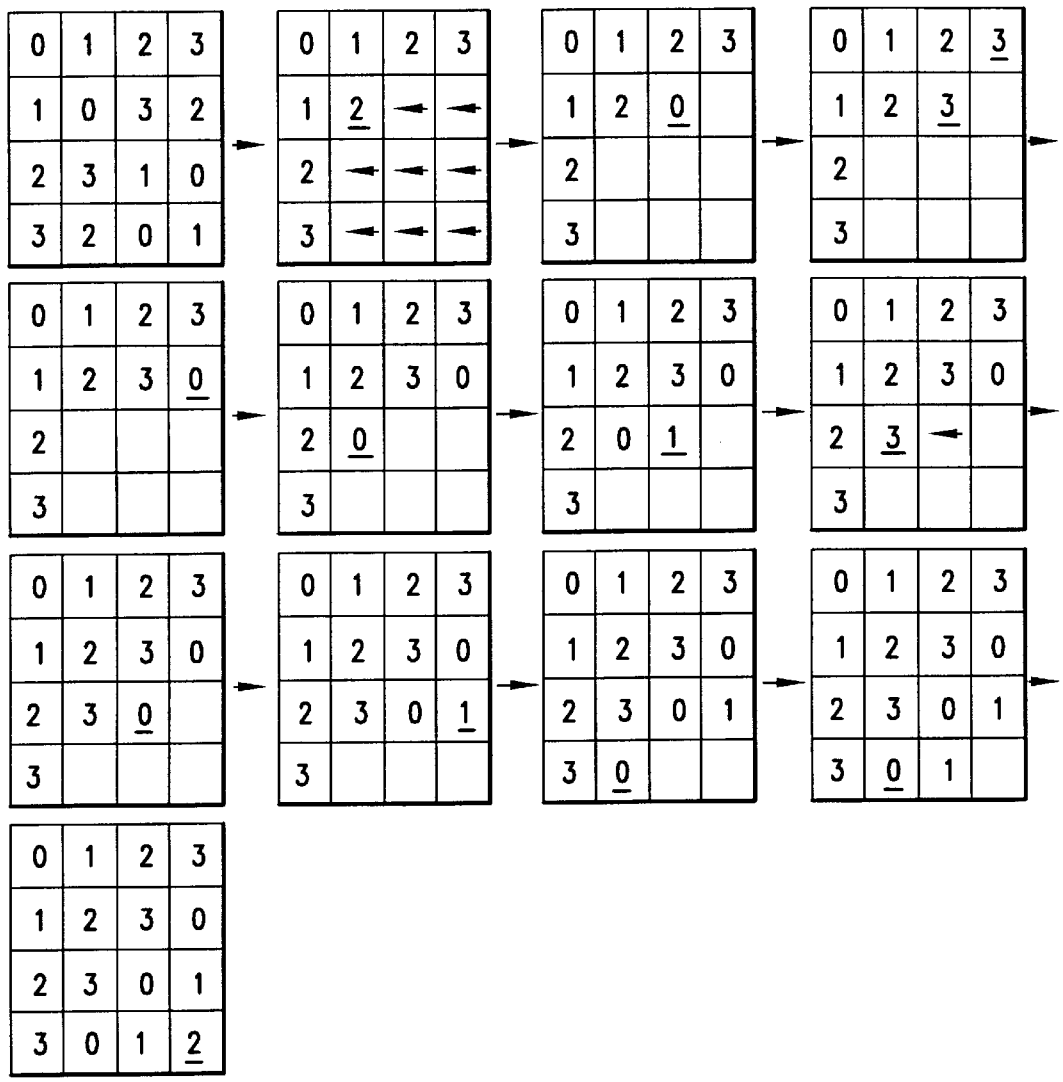
FIG. 13 shows a procedure for making a new standard Latin square from a standard Latin square shown on FIG. 12 on the basis of a flowchart shown on FIG. 8.
Figure 14:
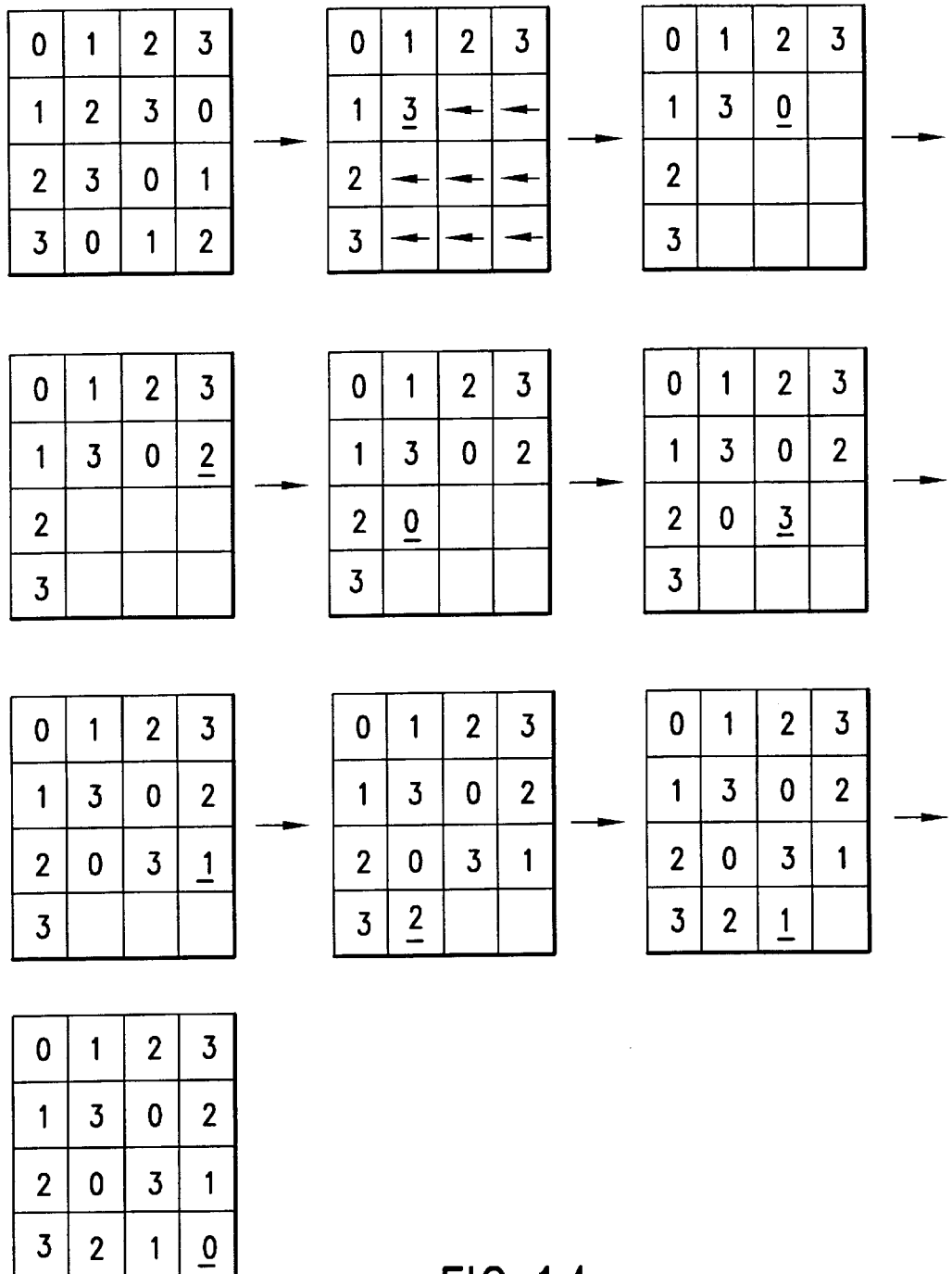
FIG. 14 shows a procedure for making a new standard Latin square from a standard Latin square shown on FIG. 13 on the basis of a flowchart shown on FIG. 8.

It is certified that error appears in the above-identified patent and that said Letters Patent is hereby corrected as shown below:

Column 6,
Line 22, (in the line below the line starting with "Fig. 3") change "according to a first aspect of the invention" to -- described in claim 1 --;
Line 24, change "according to a first aspect of this invention" to -- described in claim 1 --;
Line 28, (in the line below the line starting with "FIG. 6") change "according to a first ; aspect of this invention" to -- in claim 1 --;
Line 33, change "according to a second aspect of this invention" with -- in claim 1 --;
Line 37, (in the line below the line starting with "Fig. 10") change "9" to -- 8 by using a Latin square shown on Fig. 9 --.

Column 7,
Line 36, after "(Kij)" change "it" to -- if --.

Signed and Sealed this

Ninth Day of July, 2002

Attest:

JAMES E. ROGAN
Attesting Officer   Director of the United States Patent and Trademark Office